United States Patent [19]
Ikeda et al.

[11] Patent Number: 5,381,688
[45] Date of Patent: Jan. 17, 1995

[54] APPARATUS AND METHOD FOR DETECTING A ROAD SURFACE CONDITION OF A CAR POWERED BY A COMBUSTION ENGINE

[75] Inventors: Hiroshi Ikeda, Kariya; Taro Tabata, Kuwana; Yasuhito Takasu, Toyohashi, all of Japan

[73] Assignee: Nippondenso Co., Ltd., Kariya, Japan

[21] Appl. No.: 56,202

[22] Filed: May 4, 1993

[30] Foreign Application Priority Data

May 7, 1992 [JP] Japan .................. 4-115021

[51] Int. Cl.⁶ ............................................. G01B 5/28
[52] U.S. Cl. ..................................................... 73/105
[58] Field of Search ............ 73/105, 116, 117.3; 364/431.08, 431.07; 123/419, 436

[56] References Cited

U.S. PATENT DOCUMENTS

| | | | |
|---|---|---|---|
| 4,837,727 | 6/1989 | Tashiro et al. | 73/105 |
| 5,044,195 | 9/1991 | James | 73/117.3 |
| 5,216,915 | 6/1993 | Sakamoto | 73/117.3 |
| 5,231,869 | 8/1993 | Klenk et al. | 73/116 |
| 5,239,473 | 8/1993 | Ribbens et al. | 73/117.3 |
| 5,263,453 | 11/1993 | Wakahara et al. | |
| 5,287,736 | 2/1994 | Nakayama et al. | |

FOREIGN PATENT DOCUMENTS 61-258955 11/1986 Japan .
472450 6/1992 Japan .

OTHER PUBLICATIONS

Plapp, et al. "Methods of On-Board Misfire Detection", 1990 SAE International Congress and Exposition, SAE '90, Feb. 26–Mar. 2, pp. 9–20.

*Primary Examiner*—Robert Raevis
*Attorney, Agent, or Firm*—Cushman, Darby & Cushman

[57] ABSTRACT

An apparatus for detecting a rough road running condition of a combustion engine car comprising means for calculating change values of an output rotational speed of the engine, means for calculating an instability of the measured change values, and means for judging the car to be on a rough road when the calculated instability is more than a predetermined amount.

11 Claims, 5 Drawing Sheets

F I G. 1
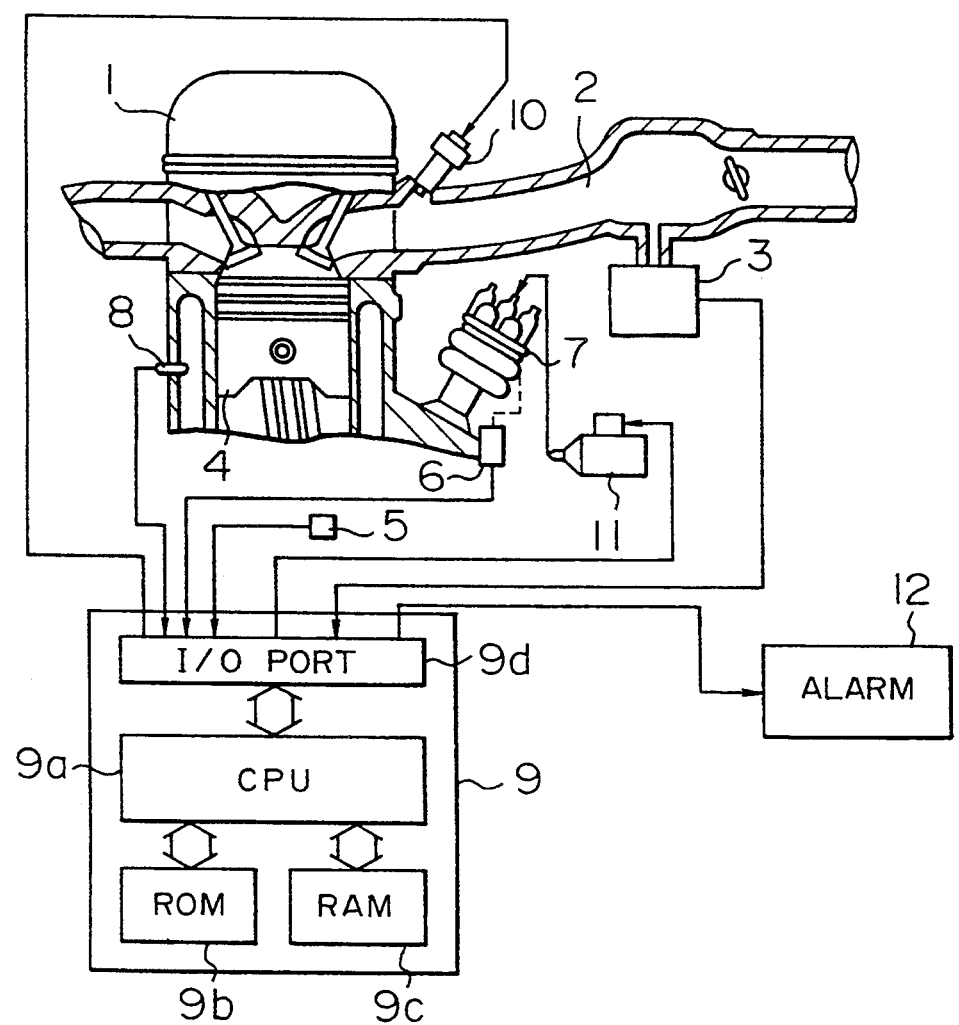

F I G. 2
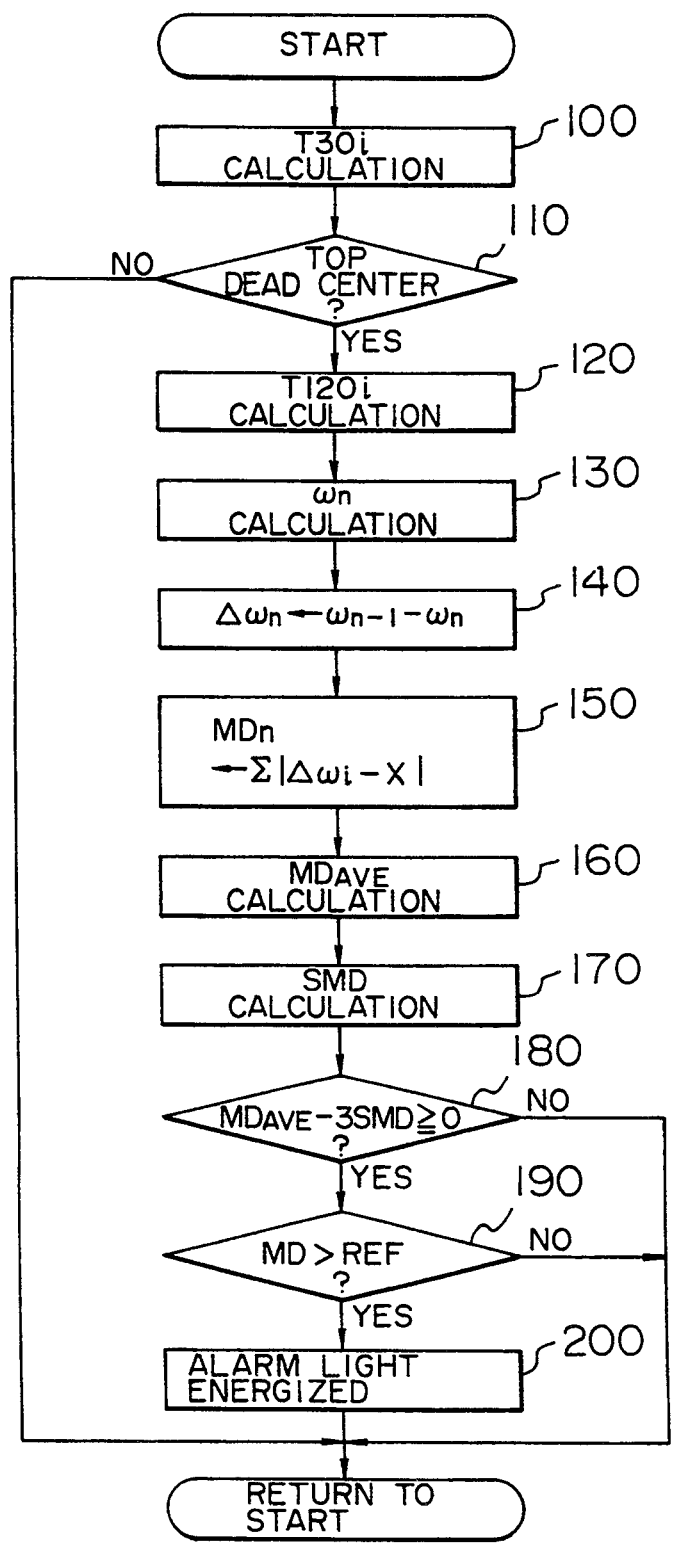

F I G. 6
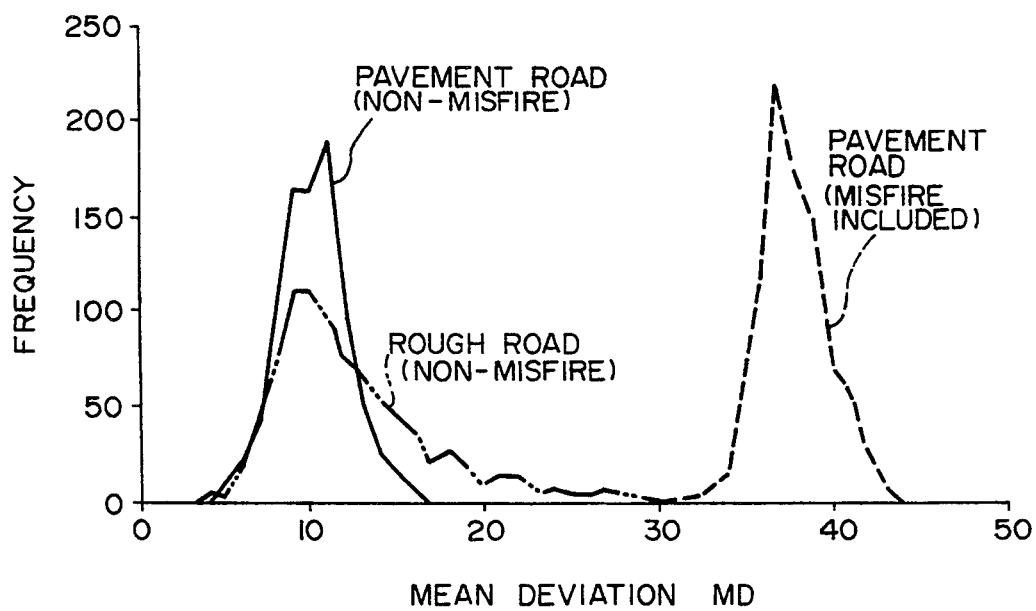
F I G. 7
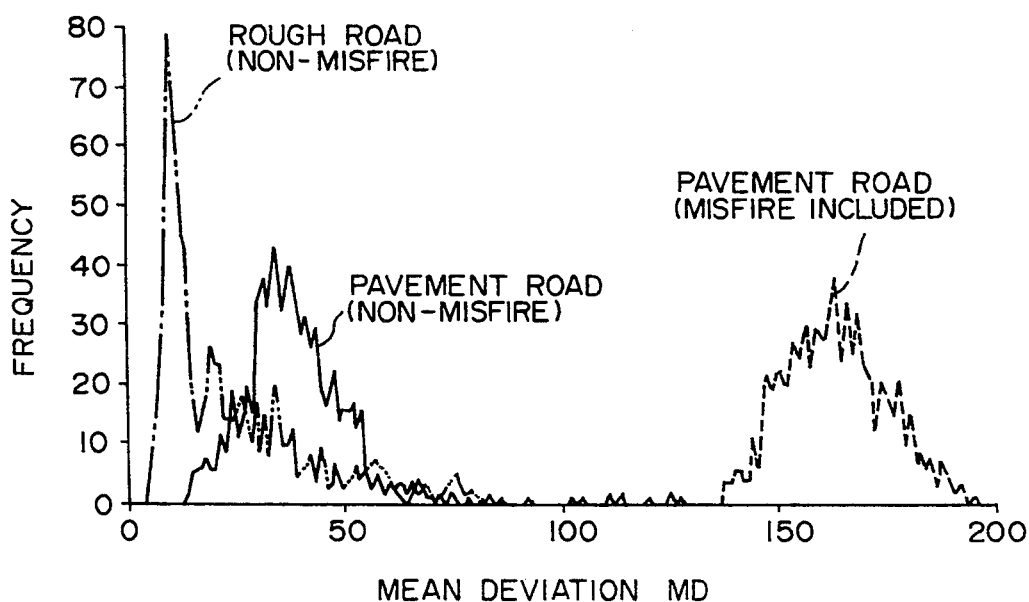

APPARATUS AND METHOD FOR DETECTING A ROAD SURFACE CONDITION OF A CAR POWERED BY A COMBUSTION ENGINE

FIELD OF THE INVENTION

The present invention relates to an apparatus for detecting a rough road running condition of a combustion engine car, and more particularly for preventing an error action of a misfire detector.

DESCRIPTION OF THE RELATED ART

In a conventional misfire detector, a misfire in a combustion chamber of a combustion engine is detected from a variation of output rotational speed of the engine, as disclosed by Publication of Japanese Unexamined Patent Application No. 61-258955. In the prior art, the rough road running condition is detected from a vibration of the car measured by an acceleration pickup mounted on the car.

An object of the present invention is to provide an apparatus for detecting a rough road running condition of a combustion engine car, without measuring a vibration of the car.

According to the present invention, an apparatus for detecting a rough road running condition of a combustion engine car comprises, means for calculating change values of output rotational speed of the engine, means for calculating an instability of the change values, and means for judging the car to be running on the rough road run when the calculated instability is more than a predetermined amount.

In the present invention, the judgement as to whether the car is on a rough road or not is performed on the basis of the instability of the measured change values of output rotational speed of the engine, and is not performed on the basis of the vibration of the car. Therefore, an acceleration pickup by which the vibration of the car is measured and whose output accuracy deteriorates with age is not necessary.

BRIEF DESCRIPTION OF THE DRAWINGS

FIG. 1 is a partially cross-sectional schematic view showing an embodiment of the present invention.

FIG. 2 is a diagram showing a flow chart according to the present invention.

FIG. 6 is a diagram showing an experimental result of relations among road conditions, mean deviations or change values of engine output speed, and frequencies of the mean deviations or change values.

FIG. 7 is a diagram showing an experimental result of relations among road conditions, mean deviations or change values of engine output speed, and frequencies of the mean deviations or change values.

DETAILED DESCRIPTION OF THE PREFERRED EMBODIMENTS

Figure 3:
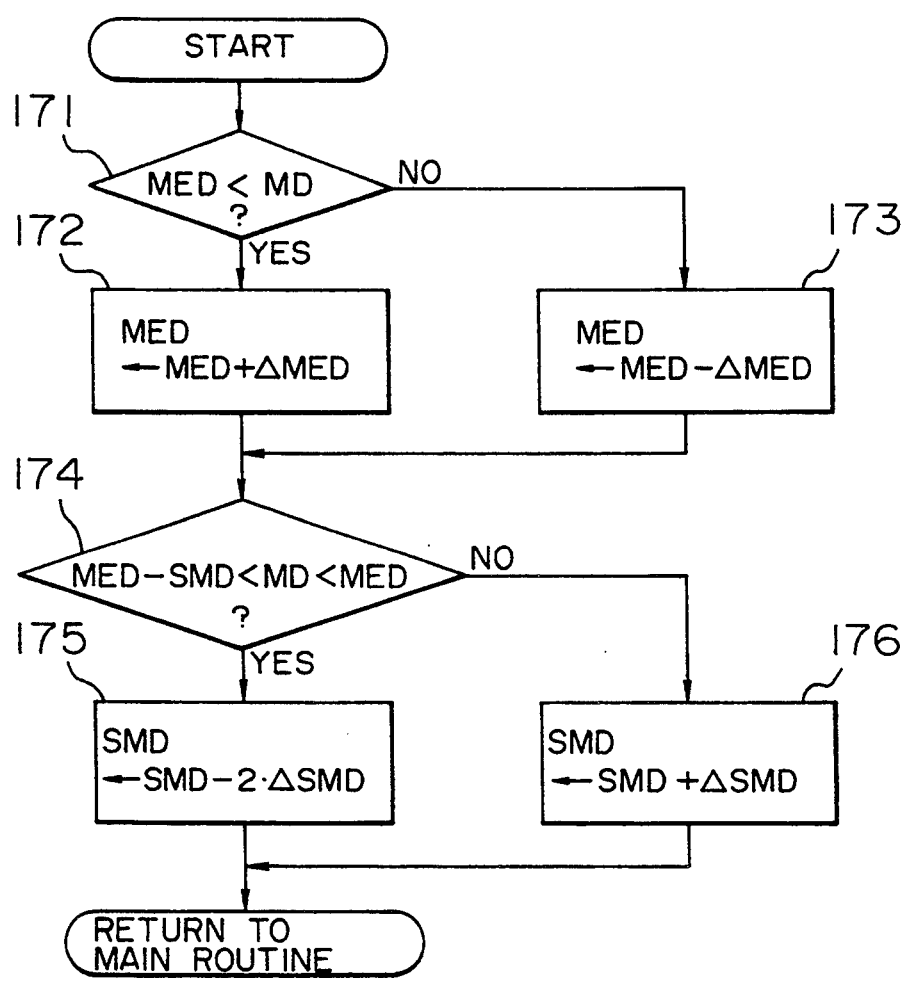
FIG. 3 is a diagram showing a flow chart according to the present invention.

As shown in FIG. 1, a 6-cylinder internal combustion engine 1 has combustion chambers or cylinders each of which receives a piston 4. An intake air tube 2 communicates with the cylinders to supply an intake air from an air cleaner (not shown) into each of the cylinders. An intake air pressure sensor 3 is arranged on the intake air tube 2 to measure a pressure in the intake air tube 2. An output signal from the intake air pressure sensor 3 is fed to an electric control unit 9 described below.

A rotational degree sensor 5 measures a rotational angle or degree of a crank shaft (not shown) of the engine 1 so that an ignition timing or a pre-ignition timing in each of the cylinders or a top dead center timing or a timing slightly before the top dead center timing of each of the pistons 4, that is, an engine output rotational speed measuring datum point is detected. Since the engine 1 of this embodiment has 6-cylinders, the rotational degree 5 sensor generates an output signal in response to the ignition or top dead center timing at intervals of 30 degrees in rotational progress of the crank shaft. If the engine 1 has 4-cylinders, the rotational degree 5 sensor generates the output signal in response to the ignition or top dead center timing at intervals of 45 degrees in rotational progress of the crank shaft. A datum piston sensor 6 is mounted on a distributer 7 to generate an output signal in response to the ignition or pre-ignition timing in a predetermined one of the cylinders or the top dead center timing or the timing slightly before the top dead center timing of a predetermined one of the pistons 4 so that it is known on the output signals from the rotational degree sensor 5 and the datum piston sensor 6 which cylinder or piston 4 is at the ignition or pre-ignition timing or the top dead center timing or the timing slightly before the top dead center timing. That is, which cylinder or piston 4 is at the engine output rotational speed measuring datum point. The output signals from the rotational degree sensor 5 and the datum piston sensor 6 are fed to the electric control unit 9 described below.

A coolant temperature sensor 8 generates an output signal corresponding to a coolant temperature in a coolant passage. The output signal from the coolant temperature sensor 8 is fed to the electric control unit 9 described below. The electric control unit (ECU) 9 calculates suitable control degrees for a fuel supply control system and an ignition control system from the above described output signals so that output signals from the ECU 9 control appropriately an injector 10 and an igniter 11.

The ECU 9 includes a central processing unit (CPU) 9a for operating the signals, a read-only memory (ROM) 9b for recording control programs and coefficients necessary for the operation of the CPU 9a, a random access memory (RAM) 9c for recording temporarily operated data for the operation of the CPU 9a, and an input/output (I/O) port 9d through which the signals are input to the CPU 9a and output from the CPU 9a. The ECU 9 operates as claimed means for calculating change values of output rotational speeds of the engine 1, claimed means for calculating an instability of the change values and claimed means for judging a car driven by the engine 1 to be on a rough road. The ECU 9 calculates the output rotational speeds of the engine 1 from the output signals from the rotational degree sensor 5, determines a frequency distribution of the calculated change values the output rotational speeds, and judges a running condition of the car from the frequency distribution. An alarm light 12 is energized when a misfire is detected by the ECU 9.

The operation of the ECU 9 is explained with reference to FIGS. 2 and 3. A routine operation shown in FIG. 2 is started in response to a detection of the 30 degrees crank shaft progress by the rotational degree sensor 5. At a step 100, an elapsed time T30$i$ between a present detection of the 30 degrees crank shaft progress and the immediately previous detection of the 30 degrees crank shaft progress of one detection ago is calculated to obtain the elapsed time necessary for the 30 degrees crank shaft progress. The calculated elapsed time T30$i$ is stored in the RAM 9c. At a step 110, the ECU 9 judges as to whether the present detection of the 30 degrees crank shaft progress or the present time is included by or substantially simultaneous with the ignition timing or pre-ignition timing in any of the cylinders or the top dead center timing or timing slightly before the top dead center timing of any of the pistons 4 or not, on the basis of the output signals from the rotational degree sensor 5 and the datum piston sensor 6. When the present time is in the ignition timing or pre-ignition timing in each of the cylinders or the top dead center timing or timing slightly before the top dead center timing of each of the pistons 4, a step 120 is carried out. When the present time is not judged to be in the ignition timing or pre-ignition timing in each of the cylinders or the top dead center timing or timing slightly before the top dead center timing of each of the pistons 4 at the step 110, the routine operation shown in FIG. 2 is interrupted to return to a main routine operation (not shown) so that the routine operation shown in FIG. 2 is initialized to restart when the 30 degrees crank shaft progress is detected newly again by the rotational degree sensor 5.

At the step 120, a total amount T120$i$ of the elapsed time T30$i$ calculated at the step 100, an elapsed time T30$i$-1 between the previous detection of the 30 degrees crank shaft progress of one detection ago and another previous detection of the 30 degrees crank shaft progress of two detections ago, an elapsed time T30$i$-2 between the previous detection of the 30 degrees crank shaft progress of two detections ago and another previous detection of the 30 degrees crank shaft progress of three detections ago, and an elapsed time T30$i$-3 between the previous detection of the 30 degrees crank shaft progress of three detections ago and another previous detection of the 30 degrees crank shaft progress of four detections ago, that is, a time T120$i$ necessary for 120 degrees crank shaft progress until the present detection of the 30 degrees crank shaft progress is calculated. At a step 130, a reciprocal of the time T120$i$ is calculated as an output rotational speed of the engine 1 for the 120 degrees crank shaft progress.

At a step 140, a speed change value of the output rotational speed of the engine 1 which speed change value may be used as the claimed change value of output rotational speed of the engine is calculated with the following formula. The speed change value $\Delta\omega_n$ is a difference between a present output rotational speed $\omega n$ of the engine 1 on the 120 degrees crank shaft progress as calculated at a present engine output rotational speed measuring datum point and a previous output rotational speed $\omega_{n-1}$ of the engine 1 on the 120 degrees crank shaft progress as calculated at a previous engine output rotational speed measuring datum point preceding by one engine output rotational speed measuring datum point from the present engine output rotational speed measuring datum point. The speed change value $\Delta\omega_n$ is the absolute value of the difference therebetween. The speed change value $\Delta\omega_n$ at each of the cylinders or the pistons 4 is calculated.

$$\Delta\omega_n = \omega_{n-1} - \omega_n$$

At a step 150, a mean deviation MD of the calculated speed change values $\Delta\omega_n$ of the output rotational speed of the engine 1 in each measuring range formed by at least one rotation of the crank shaft is calculated using the following formula. The mean deviation MD is usable as the claimed change value of output rotational speed of the engine for the alternative to the above described speed change values. In this embodiment, a number of the calculated speed change values $\Delta\omega_n$ used to obtain the mean deviation MD is six, since the engine 1 has 6-cylinders and a number of ignitions in the cylinders is 6 in each measuring range formed by two rotations of the crank shaft. X is an average value of the calculated speed change values $\Delta\omega_n$ in each measuring cycle.

$$X = (\Sigma \Delta\omega_i)/6$$

$$MD = \Sigma |\omega_i - X| \, (i=1\text{-}6)$$

An occurring frequency of the speed change values of the output rotational speed of the engine 1 or of the mean deviations MD of the calculated speed change values $\Delta\omega_n$ of the output rotational speed of the engine 1 is calculated and stored so that a frequency distribution of the speed change values of the output rotational speed of the engine 1 or of the mean deviations MD of the calculated speed change values $\Delta\omega_n$ of the output rotational speed of the engine 1 is informed. That is, a claimed frequency distribution of the change values of output rotational speed of the engine is formed.

At a step 160, a mean deviation average value $MD_{AVE}$ of the mean deviations MD is calculated or renewed on the following formula. $MD_{AVE\,n-1}$ is a previous mean deviation average value of the mean deviations MD as calculated at a previous routine operation shown in FIG. 2 proceeded by one routine operation from the present routine operation.

$$MD_{AVE} = \{(m-1) * MD_{AVE\,n-1}/m\} + (1/m) * MD$$

(m: a positive integral number, for example, 16)

At a step 170, an instability SMD of the already calculated mean deviations MD or speed change values of the output rotational speed of the engine 1 as the claimed instability of the change values of output rotational speed of the engine is calculated or renewed. A method for calculating the instability thereof will be described below in detail.

The instability SMD may be compared with a predetermined value so that the car is not judged to be on a rough road when the instability SMD is not more than the predetermined value and the car is judged to be on a rough road run when the instability SMD is more than the predetermined value. Experimental results were used for measuring various relations between the rough road running condition and the instability SMD. In this embodiment, a relationship between the instability SMD and the mean deviation average value $MD_{AVE}$ is used to determined the rough road running condition of the car. That is, the car is not judged to be on a rough road run when $(MD_{AVE} - 3 * SMD) \geq 0$, and the car is judged to be on a rough road run when $(MD_{AVE} - 3 * SMD) < 0$ gas shown at step 180.

Figure 4:
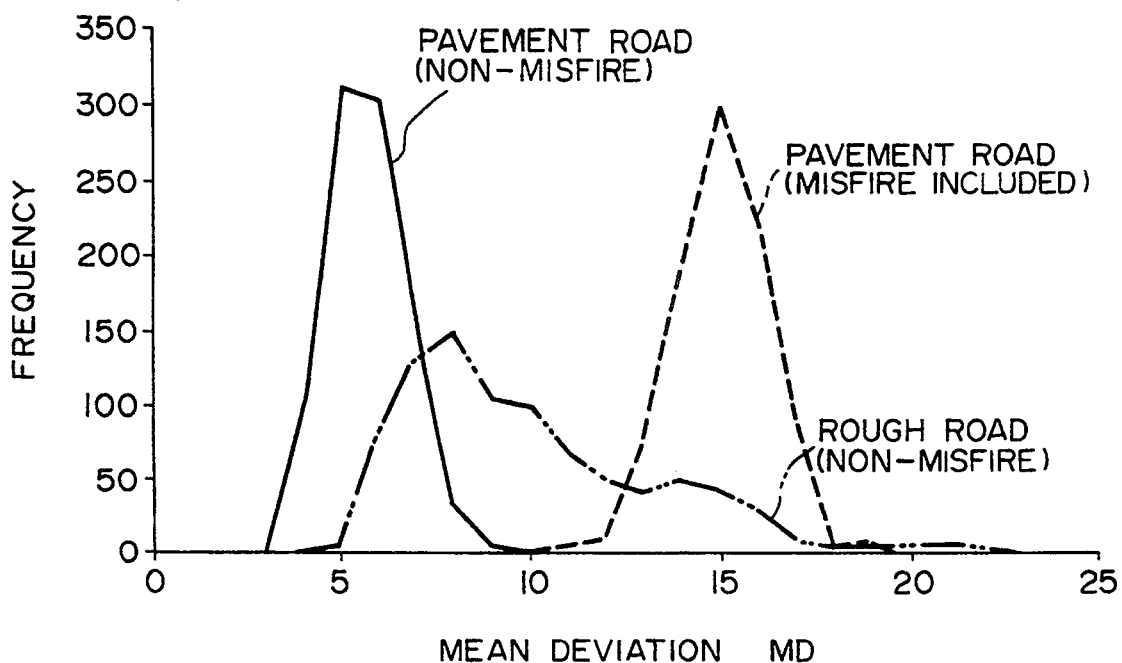
FIG. 4 is a diagram showing an experimental result of relations among road conditions, mean deviations or change values of engine output speed, and frequencies of the mean deviations or change values.

FIG. 4 shows an experimental frequency distribution of the mean deviations MD obtained when the car runs at 60 km/h. As shown therein, when the car is running on a pavement road, a frequency distribution of the mean deviations MD forms a normal frequency distribution regardless of the misfire and the instability SMD of the mean deviations MD, that is, a variation range of the mean deviations MD or of the speed change values of the output rotational speed of the engine 1 is small. But, when the car in running on a rough road, a frequency distribution of the mean deviations MD or of the speed change values of the output rotational speed of the engine 1 does not form the normal frequency distribution and the instability SMD of the mean deviations MD or of the speed change values of the output rotational speed of the engine 1. That is, a variation range of the mean deviations MD or of the speed change values of the output rotational speed of the engine 1 is large.

At a step 190, the mean deviation MD obtained at the step 150 is compared with a reference value (REF) varying according to the rotational speed of the engine 1 and a load thereof. When the mean deviation MD is larger than REF, a step 200 is carried out and the engine 1 is judged to be misfiring. When the mean deviation MD is not larger than the REF, the routine operation shown in FIG. 2 is ended to return to the main routine. At the step 200, the ECU 9 energizes the alarm light 12 and carries out a fail-safe operation. Subsequently, the routine operation shown in FIG. 2 is ended to return to the main routine.

The method for calculating the instability SMD is explained with reference to FIG. 3 showing in detail the contents of the step 170. At a step 171, a central value MED is compared with the mean deviation MD. An initial or provisional value of the central value MED is predetermined from experimental results corresponding to a running speed of the car. When the central value MED is smaller than the mean deviation MD, the central value MED is increased by a constant $\Delta$MED at a step 172. When the central value MED is not smaller than the mean deviation MD, the central value MED is decreased by the constant $\Delta$MED at a step 173. A ratio of the constant $\Delta$MED to the central value MED is 1:10–15. At a step 174, the mean deviation MD is compared with the revised central value MED and a difference (MED − SMD) between the revised central value MED and a provisional or initial value of the instability SMD. The provisional value of the instability SMD is predetermined from experimental results corresponding to the running speed of the car. When the central value MED is larger than the mean deviation MD and the mean deviation MD is larger than the difference (MED − SMD) between the revised central value MED and the value of the instability SMD, the value of the instability SMD is decreased by twice as much of a constant $\Delta$SMD (2 *$\Delta$SMD) at a step 175. When the central value MED is not larger than the mean deviation MD or the mean deviation MD is not larger than the difference (MED − SMD) between the revised central value MED and the value of the instability SMD, the value of the instability SMD is increased by the constant $\Delta$SMD at a step 176. A ratio of the constant $\Delta$SED to the instability SED is 1:10–15.

Figure 5:
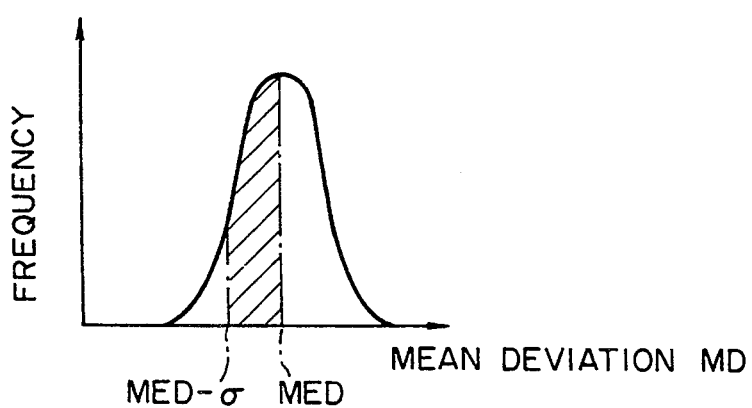
FIG. 5 is a diagram showing a normal frequency distribution.

In a normal frequency distribution as shown in FIG. 5, a probability P that the central value MED is larger than the mean deviation MD and the mean deviation MD is larger than a difference (MED − $\sigma$) between the central value MED and a standard deviation $\sigma$ is about 34%. A probability P that the central value MED is larger than the mean deviation MD and the mean deviation MD is larger than a difference (MED − SMD) between the central value MED and the instability SMD is calculated as follows. A total amount of an expectation value of increase of the instability SMD {1 * (1-P)} and an expectation value of decrease of the instability SMD {(-2) * P} is an expectation value of change of the instability SMD, and the expectation value of change of the instability SMD is zero.

$$1 * (1-P) - 2*P = 0$$

Therefore, P is about 33%, and the standard deviation $\sigma$ is substantially equal to the instability SMD calculated by a routine operation as shown in FIG. 3, when the frequency distribution of the mean deviations MD is a normal distribution.

If an initial or provisional value of the central value MED and/or of the instability SMD is not known, a part of the routine operation shown in FIG. 2 is repeated by preventing the steps 180, 190 and 200 from being carried out, until the central value MED and/or of the instability SMD is limited to a predetermined range.

Even when car runs on the pavement road, the mean deviation average value $MD_{AVE}$ of the mean deviations MD and the instability SMD vary according to a running speed of the car, as shown in FIG. 4 showing a frequency distribution of the mean deviation MD with a running speed of 60 km/h, FIG. 6 showing another frequency distribution of the mean deviation MD at a running speed of 40 km/h and FIG. 7 showing another frequency distribution of the mean deviation MD at a running speed of 20 km/h. The ECU 9 stores experimental results of the initial or provisional values of the central value MED and of the instability SMD, and of the constants $\Delta$SMD and $\Delta$MED classified according to the running speed of the car and selects appropriate ones of the initial or provisional values of the central value MED and of the instability SMD and of the constants $\Delta$SMD and $\Delta$MED therefrom according to an actual running speed of the car to calculate the mean deviation average value $MD_{AVE}$ and the instability SMD.

At the step 180, the instability SMD may be compared with the central value MED instead of the mean deviation average value $MD_{AVE}$. That is, the car is not judged to be on a rough road run when (MED − 3 * SMD) $\geq$ 0, and the car is judged to be on a rough road run when (MED − 3 * SMD) < 0.

At the step 110, the pre-ignition timing in each of the cylinders may be set before the ignition timing by about 30 degrees, and the timing slightly before the top dead center timing of each of the pistons 4 may be set before the top dead center timing by about 30 degrees.

The instability SMD may be a width of a change value range of a frequency distribution of the calculated speed change values or the mean deviations MD, which change value range receives a substantially total frequency of the speed change values or the mean deviations MD. The instability SMD may be a difference between at least two of the calculated speed change values or at least two of the mean deviations MD more than a predetermined degree during a predetermined period. The instability SMD may be a width of a change value range of a frequency distribution of the calculated speed change values or the mean deviations MD, which change value range receives substantially a predetermined percentage of a total frequency of the calculated speed change values or the mean deviations MD. The instability SMD may be a width of a change value range of a frequency distribution of the calculated speed change values or the mean deviations MD, which change value range is expected to receive a predetermined percentage of a total frequency of the calculated speed change values or the mean deviations MD. The instability SMD may be compared with an average value of the calculated speed change values or the mean deviations MD. The instability SMD may be compared with a substantially central value of the calculated speed change values or the mean deviations MD. Each of the calculated speed change values or the mean deviations MD may be calculated from a difference between the output rotational speeds of the engine, each of which is measured between an ignition in the combustion engine and a next ignition therein. Each of the calculated speed change values or the mean deviations MD may be calculated from a difference between the output rotational speeds of the engine, each of which is measured during a predetermined output rotational angle of the engine. Each of the output rotational speeds may be measured when the ignition is done in the combustion engine. Each of the output rotational speeds may be measured after the ignition is performed in the combustion engine. Each of the measurements of the output rotational speeds may be performed when the ignition is done in the combustion engine and be finished before the next ignition is started. Each of the measurements of the output rotational speeds may be performed after the ignition is done in the combustion engine and be finished before the next ignition is started. Each of the output rotational speeds may be measured when the piston of the combustion engine passes the top dead center. Each of the output rotational speeds may be measured after the piston of the combustion engine passes the top dead center. Each of the measurements of the output rotational speeds may be performed when the piston of the combustion engine passes the top dead center and be finished before another piston of the combustion engine passes another top dead center thereof. Each of the measurements of the output rotational speeds is performed after the piston of the combustion engine passes the top dead center and be finished before another piston of the combustions engine passes another top dead center thereof. A misfire signal may be output when the engine fails in ignition and the calculated instability SMD is not more than the predetermined degree, and the misfire signal is prevented from being output when the calculated instability is more than the predetermined degree.

What is claimed is:

1. An apparatus for detecting a road surface condition of a car powered by a combustion engine, comprising:
   means for calculating change values of a rotational speed of the engine;
   means for calculating a deviation (MD) of the calculated change values;
   means for calculating successively a new central value (MED) from the deviation and a previous central value;
   means for calculating successively a new standard deviation (SMD) from the deviation, the new central value and a previous standard deviation of frequency distribution of the deviation; and
   means for judging the car to be running on a rough road when the calculated standard deviation (SMD) is more than a predetermined amount.

2. An apparatus for detecting a road surface condition of a car powered by a combustion engine, comprising:
   means for calculating change values of a rotational speed of the engine;
   means for calculating deviations of the calculated change values;
   means for calculating an average value of the calculated deviations;
   means for calculating a dispersion width receiving a predetermined percentage of a frequency distribution of the calculated deviations; and
   means for judging the car to be running on a rough road by comparing a ratio between the average value and the dispersion width with a predetermined value.

3. An apparatus for detecting a road surface condition of a car powered by a combustion engine, comprising:
   means for calculating change values of a rotational speed of the engine;
   means for calculating deviations of the calculated change values;
   means for calculating a central value of the calculated deviations;
   means for calculating a dispersion width receiving a predetermined percentage of a frequency distribution of the calculated deviations; and
   means for judging the car to be running on a rough road by comparing a ratio between the central value and the dispersion width with a predetermined value.

4. An apparatus for detecting a road surface condition of a car powered by a combustion engine, comprising:
   means for calculating change values of a rotational speed of the engine;
   means for calculating deviations of the calculated change values;
   means for calculating an average value of the calculated deviations;
   means for calculating a dispersion width expected to receive a predetermined percentage of a frequency distribution of the calculated deviations; and
   means for judging the car to be running on a rough road by comparing a ratio between the average value and the dispersion width with a predetermined value.

5. An apparatus for detecting a road surface condition of a car powered by a combustion engine, comprising:
   means for calculating change values of a rotational speed of the engine;
   means for calculating deviations of the calculated change values;
   means for calculating a central value of the calculated deviations;
   means for calculating a dispersion width expected to receive a predetermined percentage of a frequency distribution of the calculated deviations; and
   means for judging the car to be running on a rough road by comparing a ratio between the central value and the dispersion width with a predetermined value.

6. An apparatus for detecting a road surface condition of a car powered by a combustion engine, comprising:
   means for calculating change values of a rotational speed of the engine;
   means for calculating an instability of the calculated change values; and
   means for judging the car to be running on a rough road when the calculated instability is more than a predetermined degree;
   wherein the instability of the change values is a width of a change value dispersion range receiving a plurality of the calculated change values different from each other.

7. A method for detecting a road surface condition of a car powered by a combustion engine, comprising steps of:
   repeatedly sensing a rotational speed of the engine;
   calculating change values of the repeatedly-sensed rotational speed of the engine;
   calculating deviations of the calculated change values;
   predetermining a central value of the deviation of the calculated change values;
   calculating successively the central value from a latest calculated deviation and a latest determined central value;
   predetermining a standard deviation of a frequency distribution of the deviation;
   calculating successively the standard deviation of frequency distribution of the deviation from a latest calculated deviation, the latest determined central value and a latest determined standard deviation of frequency distribution of the deviation; and
   determining the car to be running on a rough road when the calculated standard deviation is more than a predetermined amount.

8. A method for detecting a road surface condition of a car powered by a combustion engine, comprising steps of:
   repeatedly sensing a rotational speed of the engine;
   calculating change values of the repeatedly sensed rotational speed of the engine;
   calculating deviations of the calculated change values;
   predetermining an average value of the calculated deviations;
   calculating successively an average value of the calculated deviations;
   calculating successively a dispersion width receiving a predetermined percentage of a frequency distribution of the calculated deviations; and
   determining the road surface condition by comparing a ratio between the average value and the dispersion width with a predetermined value.

9. A method for detecting a road surface condition of a car powered by a combustion engine, comprising steps of:
   repeatedly sensing a rotational speed of the engine;
   calculating change values of the repeatedly sensed rotational speed of the engine;
   calculating deviations of the calculated change values;
   predetermining a central value of the calculated deviations;
   calculating successively the central value of the calculated deviations;
   calculating successively a dispersion width receiving a predetermined percentage of a frequency distribution of the calculated deviations; and
   determining the road surface condition by comparing a ratio between the central value and the dispersion width with a predetermined value.

10. A method for detecting a road surface condition of a car powered by a combustion engine, comprising steps of:
    repeatedly sensing a rotational speed of the engine;
    calculating change values of the repeatedly sensed rotational speed of the engine;
    calculating deviations of the calculated change values;
    predetermining an average value of the calculated deviations;
    calculating successively the average value of the calculated deviations;
    calculating successively a dispersion width expected to receive a predetermined percentage of a frequency distribution of the calculated deviations; and
    determining the road surface condition by comparing a ratio between the average value and the dispersion width with a predetermined value.

11. A method for detecting a road surface condition of a car powered by a combustion engine, comprising steps of:
    repeatedly sensing a rotational speed of the engine;
    calculating change values of the repeatedly sensed rotational speed of the engine;
    calculating deviations of the calculated change values;
    predetermining a central value of the calculated deviations;
    calculating successively a central value of the calculated deviations;
    calculating successively a dispersion width expected to receive a predetermined percentage of a frequency distribution of the calculated deviations; and
    determining the road surface condition by comparing a ratio between the central value and the dispersion width with a predetermined value.

* * * * *